(12) United States Patent
Flint et al.

(10) Patent No.: US 11,018,969 B2
(45) Date of Patent: *May 25, 2021

(54) UDPING-CONTINUOUS ONE-WAY MONITORING OF MULTIPLE NETWORK LINKS

(71) Applicant: Oath Inc., New York, NY (US)

(72) Inventors: Ian Flint, Cupertino, CA (US); Igor Gashinsky, New York, NY (US)

(73) Assignee: Verizon Media Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/558,205

(22) Filed: Sep. 2, 2019

(65) Prior Publication Data
US 2019/0386907 A1 Dec. 19, 2019

Related U.S. Application Data

(63) Continuation of application No. 15/394,008, filed on Dec. 29, 2016, now Pat. No. 10,404,567.

(51) Int. Cl.
| | | |
|---|---|---|
| *H04L 12/26* | (2006.01) | |
| *H04L 29/06* | (2006.01) | |
| *H04L 12/721* | (2013.01) | |
| *H04L 12/741* | (2013.01) | |
| *H04L 12/805* | (2013.01) | |

(52) U.S. Cl.
CPC ............... *H04L 43/10* (2013.01); *H04L 43/08* (2013.01); *H04L 69/14* (2013.01); *H04L 45/66* (2013.01); *H04L 45/745* (2013.01); *H04L 47/36* (2013.01); *H04L 69/161* (2013.01); *H04L 69/22* (2013.01); *H04L 2212/00* (2013.01)

(58) Field of Classification Search
CPC ......... H04L 43/10; H04L 43/08; H04L 69/14; H04L 45/66; H04L 45/745; H04L 47/36; H04L 69/161; H04L 69/22
See application file for complete search history.

(56) References Cited

U.S. PATENT DOCUMENTS

| | | | | |
|---|---|---|---|---|
| 2006/0198352 | A1* | 9/2006 | Bruck | H04L 12/18 370/347 |
| 2007/0183313 | A1* | 8/2007 | Narayanan | H04L 49/552 370/216 |
| 2009/0080328 | A1* | 3/2009 | Hu | H04L 65/80 370/230 |
| 2010/0236852 | A1* | 9/2010 | Shiratori | B60K 13/02 180/68.3 |
| 2010/0278191 | A1* | 11/2010 | Gupta | G06F 21/552 370/419 |
| 2011/0016223 | A1* | 1/2011 | Iannaccone | H04L 45/00 709/232 |

(Continued)

*Primary Examiner* — Chi Ho A Lee
(74) *Attorney, Agent, or Firm* — Cooper Legal Group, LLC

(57) ABSTRACT

Methods and apparatus for monitoring network links are disclosed. In one implementation, a client device composes a plurality of data packets and transmits the data packets via a network to a server via two or more ports of the client device. The data packets are transmitted via multiple paths across the network. After transmitting the data packets to the server, the client device composes and transmits a control packet to the server, where the control packet indicates a total number of the data packets that have been transmitted by the client device to the server.

20 Claims, 6 Drawing Sheets

(56) References Cited

U.S. PATENT DOCUMENTS

| | | | |
|---|---|---|---|
| 2012/0236852 A1* | 9/2012 | Lin | H04L 49/351 370/389 |
| 2013/0128738 A1* | 5/2013 | Cohen | H04L 45/125 370/235 |
| 2013/0290814 A1* | 10/2013 | Hwang | H04L 1/0041 714/776 |
| 2016/0294647 A1* | 10/2016 | Agarwal | H04L 49/208 |
| 2017/0034003 A1* | 2/2017 | Shevach | H04L 1/0083 |
| 2018/0077663 A1* | 3/2018 | Davis | H04W 56/0015 |

* cited by examiner

UDPING-CONTINUOUS ONE-WAY MONITORING OF MULTIPLE NETWORK LINKS

CROSS REFERENCE TO RELATED APPLICATION

This application claims priority to and is a continuation of U.S. application Ser. No. 15/394,008, filed on Dec. 29, 2016, entitled "UDPING—CONTINUOUS ONE-WAY MONITORING OF MULTIPLE NETWORK LINKS", which issued on Sep. 3, 2019 as U.S. Pat. No. 10,404,567 and is incorporated by reference herein in its entirety.

BACKGROUND

The present disclosure relates generally to computer implemented methods and apparatus for monitoring the performance of a network. More particularly, the disclosure relates to monitoring network links.

Ping is a computer network administration software utility used to test the reachability of a host on an Internet Protocol (IP) network. More particularly, ping measures the round-trip time for messages sent from the originating host to a destination computer that are echoed back to the source.

Ping operates by sending Internet Control Message Protocol (ICMP) Echo Request packets to the target host and waiting for an ICMP Echo Reply packet. The program reports errors, packet loss, and a statistical summary of the results, typically including the minimum, maximum, the mean round-trip times, and standard deviation of the mean.

Another way to obtain network performance metrics is through the use of a one-way protocol such as the one-way active measurement protocol (OWAMP). Through the use of OWAMP, User Datagram Protocol (UDP) packets are transmitted and measurement results such as the transmission time and number of packets transmitted are returned.

The User Datagram Protocol (UDP) is a connectionless transmission protocol that does not require prior communications to set up transmission channels or data paths. UDP provides checksums for data integrity and port numbers for addressing different functions at the source and destination of the datagram. However, there is no guarantee of delivery, ordering, or duplicate protection.

SUMMARY

In one implementation, a client device composes a plurality of data packets and transmits the data packets to a server from two or more ports of the client device. For example, the data packets may be transmitted such that a first subset of the plurality of data packets is transmitted via a first port on the client device and a second subset of the plurality of data packets is transmitted via at least a second port on the client device. After transmitting the data packets to the server, the client device composes and transmits a control packet to the server, where the control packet indicates a total number of data packets that have been transmitted by the client device to the server.

In another implementation, the present disclosure pertains to a computing system comprising a processor and a memory. The computing system may be configured to perform one or more of the disclosed method operations. In another implementation, the present disclosure pertains to a computer readable storage medium having computer program instructions stored thereon that are arranged to perform one or more of the disclosed method operations.

These and other features and advantages of the present disclosure will be presented in more detail in the following specification of the present disclosure and the accompanying figures which illustrate by way of example the principles of the present disclosure.

DETAILED DESCRIPTION OF THE SPECIFIC IMPLEMENTATIONS

Figure 1:
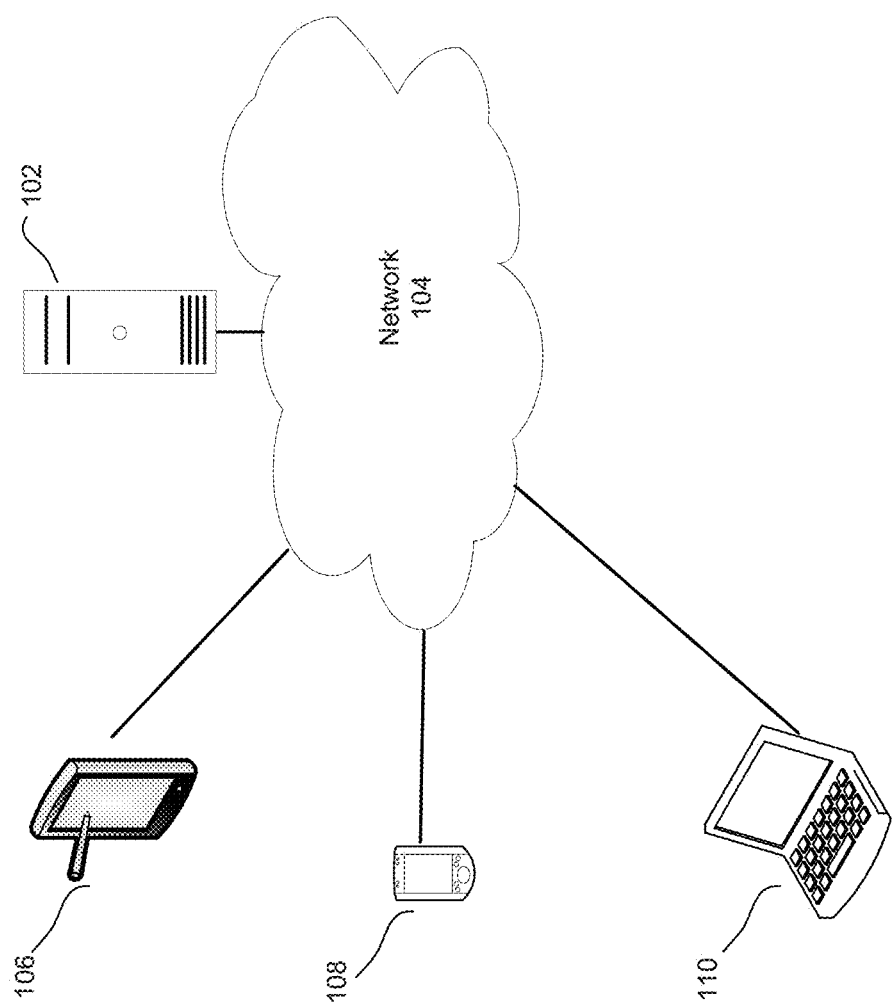
FIG. 1 is a block diagram illustrating an example system.

Reference will now be made in detail to specific implementations of the disclosure. Examples of these implementations are illustrated in the accompanying drawings. While the disclosure will be described in conjunction with these specific implementations, it will be understood that it is not intended to limit the disclosure to these implementations. On the contrary, it is intended to cover alternatives, modifications, and equivalents as may be included within the spirit and scope of the disclosure as defined by the appended claims. In the following description, numerous specific details are set forth in order to provide a thorough understanding of the disclosure. The disclosed implementations may be practiced without some or all of these specific details. In other instances, well known process operations have not been described in detail in order not to unnecessarily obscure the disclosure. The Detailed Description is not intended as an extensive or detailed discussion of known concepts, and as such, details that are known generally to those of ordinary skill in the relevant art may have been omitted or may be handled in summary fashion.

Subject matter will now be described more fully hereinafter with reference to the accompanying drawings, which form a part hereof, and which show, by way of illustration, specific example implementations. Subject matter may, however, be embodied in a variety of different forms and, therefore, covered or claimed subject matter is intended to be construed as not being limited to any example implementations set forth herein; example implementations are provided merely to be illustrative. Likewise, a reasonably broad scope for claimed or covered subject matter is intended. Among other things, for example, subject matter may be embodied as methods, devices, components, or systems. Accordingly, implementations may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one implementation" as used herein does not necessarily refer to the same implementation and the phrase "in another implementation" as used herein does not necessarily refer to a different implementation. It is intended, for example, that claimed subject matter include combinations of example implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

While ICMP may be used to measure the round trip time in a network by sending two different packets, it does not give insight into the breakdown of latency into the two legs that make up a round trip. More particularly, Echo Request and Echo Reply packets may traverse different paths that are of different lengths. In addition, some devices give different priority to ICMP traffic versus normal traffic. Finally, since traffic routing decisions are based on a function of the TCP/IP five-tuple (protocol, source IP, source port, destination IP, destination port), it is difficult to exercise all potential paths that a normal packet may traverse. Therefore, it is difficult to ascertain accurate measurements of network conditions using ICMP.

Likewise, packets transmitted via One-Way Ping (OWAMP) are all transmitted over the same route across the network, since they all share the same five-tuple. As a result, network measurements do not accurately reflect the condition of the entirety of the network.

Moreover, the ping utility may send infrequent packets. As a result, the data gathered using the ping utility may not detect short-term transients in network conditions.

In addition, OWAMP requires a handshake to establish a connection. As a result, OWAMP is not practical for performing continuous measurement for a network.

Typically, there is a maximum packet size that can be transmitted across a given network link. Since different networks and network links may not support packets of the same size, a router may split a packet that is too large to transmit to its destination. In these instances, the number of packets that are transmitted by a client device to a destination will not necessarily equal the number of packets that are received at the destination. Furthermore, even if the number of packets that have been transmitted to the destination is equal to that received at the destination, it is possible that some of the transmitted packets have not been received. As a result, it can be difficult to ascertain whether all of the packets that have been transmitted across a network have reached their intended destination.

In accordance with various implementations, network links may be continuously monitored to gather metrics pertaining to the network links. By verifying that the sizes of data packets that are received is the same as the sizes of the data packets that have been transmitted, accurate network metrics may be obtained. This may be accomplished without synchronization of clocks between client and server devices.

FIG. 1 is a diagram illustrating an example system. The disclosed implementations may be implemented in some centralized manner. This is represented in FIG. 1 by server(s) 102, which may correspond to multiple distributed devices and data store(s).

Server(s) 102 may receive packets from clients 106, 108, 110 via network 104. Based upon the packets received from the clients 106, 108, 110, the server(s) 102 may generate network metrics or statistics. The network statistics may be stored and/or provided for analysis of network throughput.

Implementations disclosed herein may be implemented via the server(s) 102 and/or the clients 106, 108, 110. For example, various features may be implemented via an application on the clients 106, 108, 110. The disclosed implementations may be implemented via software and/or hardware.

As shown, one or more clients 106, 108, 110 may send packets to the servers 102 via network 104. The client devices 106, 108, 110 may be implemented, for example, via any type of computer (e.g., desktop, laptop, tablet, etc.), media computing platforms (e.g., cable and satellite set top boxes), handheld computing devices (e.g., PDAs), cell phones, or any other type of computing or communication platform.

The disclosed implementations may be practiced in a wide variety of network environments (represented by network 104) including, for example, Ethernet-based networks, telecommunications networks, wireless networks, etc. The network 104 may take any suitable form, such as a wide area network or Internet and/or one or more local area networks (LAN's). The network 104 may include any suitable number and type of devices, e.g., routers and switches, for forwarding requests including search or web object requests from each client to the pertinent application (e.g., search or web application) and search or web results back to the requesting clients.

An application offering accounting services in relation to packets received from client devices may be implemented on any number of servers although only a single server 102 is illustrated for clarity. In some implementations, an application installed on the client devices enables the client devices to send packets to the server 102. For example, the application installed on the client devices may be a browser or a mobile application configured to communicate with an application on the server 102.

A client device may transmit packets to the server 102 in response to user input received or detected by the client device. Alternatively, a client device may transmit packets to the server 102 automatically (e.g., according to computer-readable instructions executed by the server 102.

Figure 2:
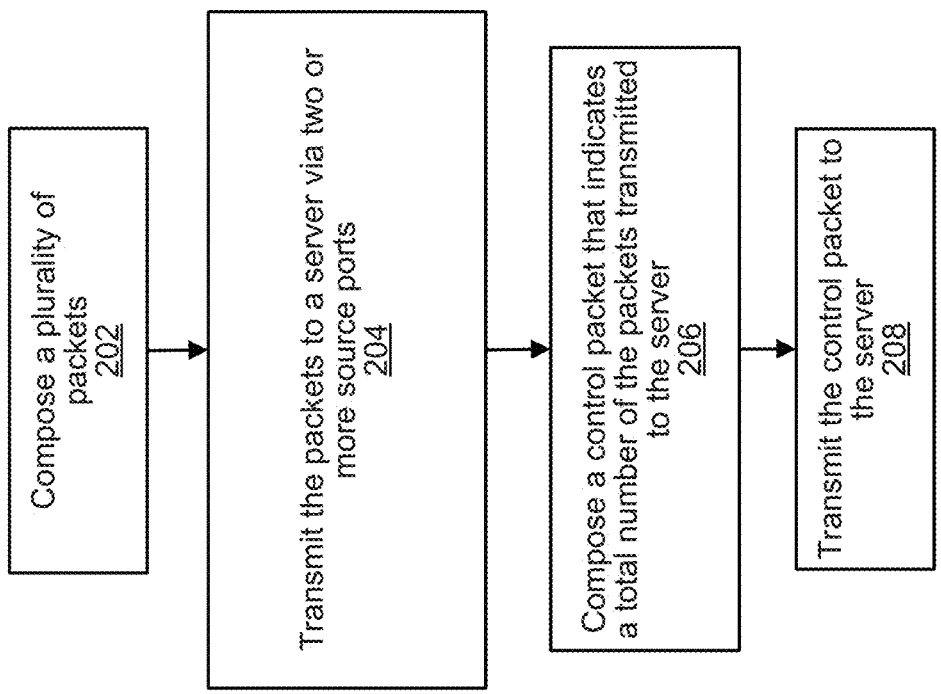
FIG. 2 is a process flow diagram illustrating an example method of collecting network statistics in accordance with various implementations.

FIG. 2 is a process flow diagram illustrating an example method of collecting network statistics in accordance with various implementations. A client device composes a plurality of packets at 202. More particularly, the packets may be data packets. In one implementation, each of the packets is a User Datagram Protocol (UDP) packet.

At least a portion of the data packets may be padded so that the packets that are transmitted to the server are of various different sizes. In one implementation, for each data packet, a packet size is selected via a random number generator and the data packet is padded according to the packet size selected for that data packet. In some instances, the packet size that is selected may indicate that padding is not required for a given data packet. Thus, at least a portion of the data packets may be padded so that the data packets that are transmitted to the server are of various different sizes. A data packet may be padded by padding the body of the packet with zeros or other characters. The sizes of the packets may be randomized using a random number generator within a range of sizes defined by a maximum packet size. The maximum packet size may be statically or dynamically configured. For example, the maximum packet size may be specified or otherwise indicated via a graphical user interface. For example, the size of a given packet may be within a range of 0-10000 bytes.

The client device may transmit the data packets along multiple routes in the network. This is accomplished, in part, by sending the data packets via multiple ports of the client device. The client device may transmit the data packets to a server via two or more ports of the client device. The number of ports via which packets are transmitted may be statically or dynamically configured. For example, the desired number of source ports may be configured via a graphical user interface. As another example, the number of source ports may be dynamically configured via a random number generator. To simplify the following example, a method of transmitting packets via two different ports is illustrated.

As shown in FIG. 2, a first subset of the packets may be transmitted via a first port of the client device and a second subset of the packets via a second port of the client device at 204. For example, the packets may be transmitted according to a starting source port and number of source ports. Within a particular packet, the port of the client device is identified in a source port field of a header of the packet. By varying the source port via which data packets are transmitted, this guarantees that the packets will traverse different paths.

In addition, the packets may be transmitted via multiple next-hop routers. This may include, for example, transmitting, at least one data packet from a given port via a MAC address of each next-hop router. More particularly, for each port of two or more ports of the client device, packets may be sent via a media access control (MAC) address each of the next-hop routers of the client device. In some implementations, for each port-MAC address combination, a packet size is randomly selected, a packet is generated and padded according to the selected packet size, and the packet is transmitted via the port-MAC address combination.

In one implementation, the packets are transmitted according to random sampling intervals. In other words, the time interval between the transmission of each pair of packets may vary over time. For example, a sampling interval may be determined using a random number generator. Through the use of random sampling intervals, a resonance effect may be avoided. In addition, network events that occur at specific intervals or occur infrequently are more likely to be detected.

To ensure the accuracy of the network statistics that are collected, the number of packets that are transmitted may be at least approximately 100 packets per second. Stated another way, the packets may be transmitted at an average of one every 10 milliseconds.

A sequence of packets may be transmitted over a period of time. For example, packets may be transmitted for a specific number of seconds.

After transmitting the packets to the server, the client device may generate a summary of the packets that have been transmitted to the server. The client device may generate a summary of the data packets that have been transmitted to the server and provide the summary in a single packet. In one implementation, the client device composes a control packet at 206. For example, the control packet may indicate information such as a total number of data packets that the client device has transmitted to the server. The client device transmits the control packet to the server at 208.

The data packets and control packet(s) each has a header that includes an identifier such as a globally unique identifier (GUID) that can be used to associate the data packets with the control packet. In other words, the identifier may identify a particular session for a particular client device. In addition, the header of a data packet may also include a timestamp indicating a time that the packet was transmitted and/or a sequence number. The sequence number may be incremented for each subsequent data packet that is transmitted during the session.

The identifier may periodically be modified or regenerated to transmit a new series of data packets. For example, the identifier may be regenerated every 10 seconds, after a particular number of data packets have been transmitted, or at the start of a new session of packets. In some implementations, the regeneration of the identifier may be accomplished by incrementing the identifier.

The server may generate network statistics from the packets received from one or more clients. Examples of network statistics that may be collected by the server will be described in further detail below.

Upon receiving each of the data packets, the server may generate a timestamp indicating a time of receipt of the data packet. Using the timestamp of receipt and timestamp associated with packet transmission, the server may ascertain the transmission time of the data packet across the network. More particularly, the server may compare, for each of the data packets, the timestamp within the packet header with a timestamp indicating a time of receipt of the data packet by the server. The difference between these two times may indicate the approximate transmission time for the data packet from the client device to the server. The server may maintain the transmission time of each data packet, which may also be referred to as latencies. The server may also determine a maximum latency for the identifier and/or a minimum latency for the identifier.

In addition, the server may compare information associated with the received data packets with information provided in the control packet. For example, the server may count the number of data packets having the same identifier (e.g., GUID) that have been received by the server, and compare the number of data packets received with the number of data packets transmitted according to the information (e.g., the highest sequence number of data packets transmitted during the session corresponding to the identifier) in the control packet. As another example, the server may compare the size of a received data packet with the size of the data packet indicated in the control packet. If the sizes are not the same, the server may conclude that the packet was split by a router during transmission. The transmission of data packets of various different sizes may also be useful in identifying patterns of packet routing within the network based upon packet size.

In some implementations, the server may use the information obtained from a control packet associated with a particular identifier in combination with the latencies of the data packets associated with the identifier. For example, the server may determine the mean latency for a given identifier, the sum of the squares of the latency, and/or the standard deviation of the latency.

Since the clocks at the client device(s) and the server may differ, the data packet transmission times (e.g., latencies) ascertained by the server may be inaccurate. However, the amount of jitter among the data packets may be accurately ascertained, and any significant changes in packet transmission times can be detected.

In one implementation, the server does not send reply packets to the clients. Rather, the network statistics are generated and/or collected by the server and maintained at the server. The server may transmit the network statistics to another device for analysis. Alternatively, the server may be queried by another device for various network statistics.

The above-described example is set forth with respect to a single client device. However, the disclosed implementations may be implemented with any number of clients.

Figure 3:
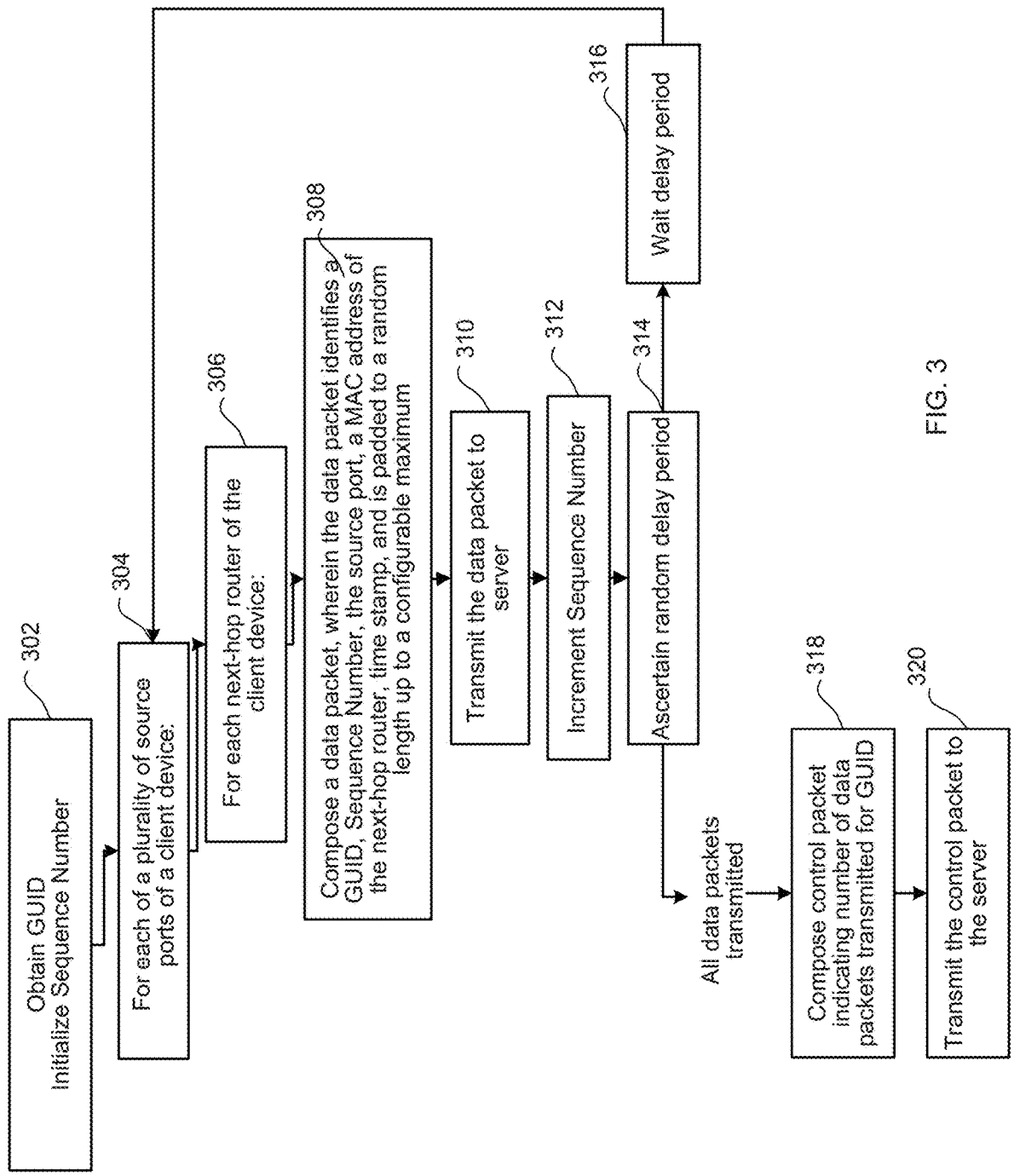
FIG. 3 is a process flow diagram illustrating an example method of performing network monitoring in accordance with various implementations.

FIG. 3 is a process flow diagram illustrating an example method of performing network monitoring in accordance with various implementations. As shown in FIG. 3, variables may be initialized or obtained at 302. For example, an identifier (e.g., GUID) that is incremented over time for a single client device or multiple client devices may be obtained. As another example, a sequence number that identifies the packet within a sequence of packets that has been transmitted for the identifier may be initialized.

As shown in FIG. 3, data packets are composed and transmitted for each of a plurality of source ports of a client device as shown at 304, for each next-hop router of the client device as shown at 306. More particularly, for a given source port and next-hop router, a data packet is composed at 308. A header of the data packet may include the identifier (e.g., GUID) for a packet sequence, sequence number of the packet within the sequence, a source IP address associated with the client, the source port, and a MAC address of the next-hop router. The data packet may be padded to a size determined according to a random number generator. The header may further include a time stamp that represents the time at which the packet is transmitted to a server at 310. In addition, the header may further include a destination IP address and destination MAC address of the server to which the packet is transmitted. After the data packet is transmitted, the sequence number is incremented as shown at 312. Subsequent packets may be transmitted after randomly generated delay periods, as shown at 314 and 316. An example data packet will be described in further detail below with reference to FIG. 4A.

Data packets may be transmitted by the client device for a given sequence identified by the identifier (e.g., GUID) for a particular period of time. For example, data packets may be transmitted via a round-robin algorithm for each source port-MAC address combination until the time period has expired. If a data packet has been transmitted for each source port-MAC address combination, the round-robin algorithm may send further packets for each source port-MAC address combination.

Alternatively, a specific number of data packets may be transmitted by the client device for the identifier (e.g., GUID). For example, for each source port and MAC address combination, a single data packet may be transmitted.

After the data packets in the sequence for the identifier (e.g., GUID) have been transmitted, a control packet may be composed at 318 and transmitted at 320. The control packet may indicate statistical information associated with the sequence such as the number of data packets that have been transmitted (e.g., the highest sequence number). An example control packet will be described in further detail below with reference to FIG. 4B.

The algorithm described above with reference to FIG. 3 is presented with respect to a single client device and single data packet sequence. However, it is important to note that the disclosed implementations may be implemented for multiple devices, as well as multiple data packet sequences for a given client device.

Figure 4A:
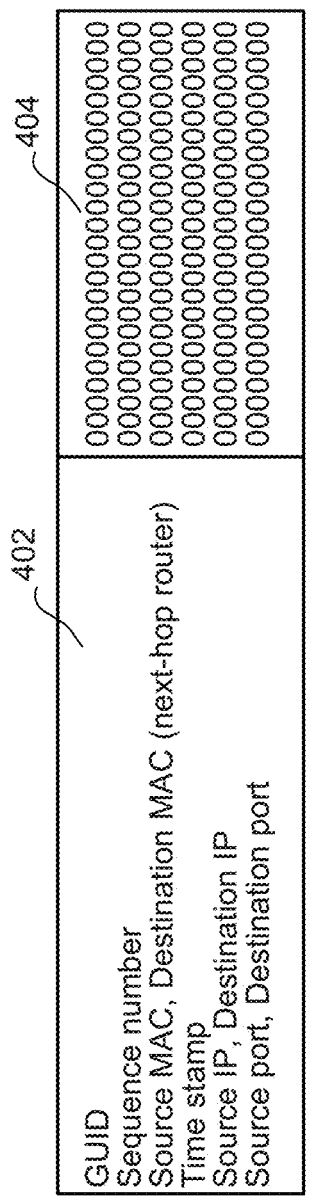
FIG. 4A is a diagram illustrating an example data packet that can be may be transmitted according to various implementations.

FIG. 4A is a diagram illustrating an example data packet that can be may be transmitted according to various implementations. Each data packet includes header(s) 402 and body 404. The header 402 includes an identifier such as a GUID that identifies a sequence of packets transmitted by a client device. In addition, header(s) 402 include a sequence number that identifies a specific packet within the sequence.

In some implementations, the data packet includes an Ethernet frame. An Ethernet header includes a source MAC address, a MAC address of a next-hop router associated with the client device, and a time stamp. Tthe header(s) 402 further include an IP header having a source IP address identifying an IP address associated with the client device and a destination IP address identifying an IP address associated with a server.

In one implementation, the IP packet includes a User Datagram (UDP) datagram. A User Datagram Protocol (UDP) header of a UDP datagram includes a source port number identifying a source port of the client device and a destination port number identifying a destination port of the server. The body 404 of the data packets may vary in size. As described above, the size of the body 404 of a data packet may be increased by padding the body 404 with zeros or other characters.

Figure 4B:
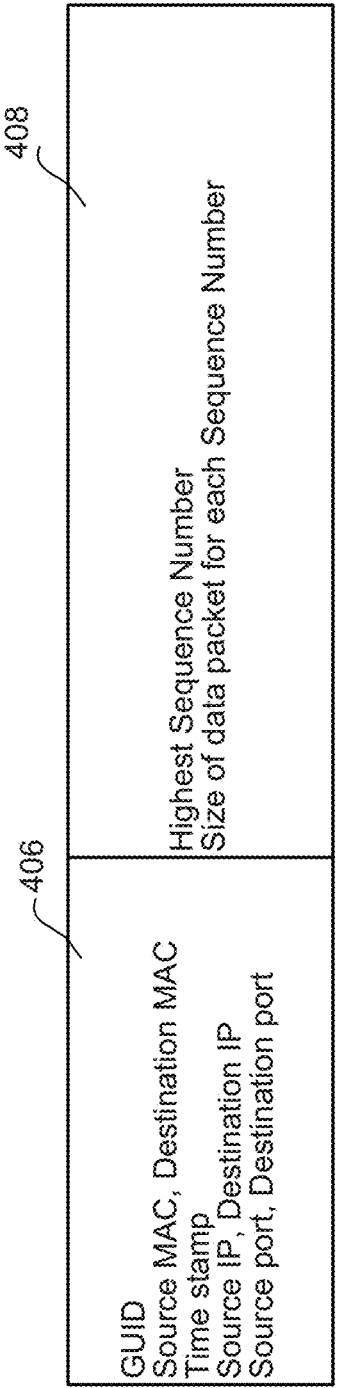
FIG. 4B is a diagram illustrating an example control packet that may be transmitted according to various implementations.

Control packets may similarly be transmitted via UDP and encapsulated in Ethernet frames. FIG. 4B is a diagram illustrating an example control packet that may be transmitted according to various implementations. Each control packet includes header(s) 406 and a body 408. The header(s) 406 may include the identifier (e.g., GUID), source IP address, destination IP address, source port, and destination port. As described above, the header(s) 406 may further include a source MAC address, a destination MAC address, and a time stamp. The time stamp provided in the control packet need not be used to generate statistics for the network. Control packets may be distinguished from data packets via a flag within header(s) 406.

The control packet may further indicate the number of packets that have been transmitted in the sequence. For example, the control packet may indicate the sequence number of the last data packet of the sequence. In one implementation, the sequence number of the last data packet of the sequence is provided in the body 408 of the control packet.

The control packet may also indicate, for each of the data packets (e.g., identified by a sequence number), the size of the data packet. More particularly, the body 408 of the control packet may indicate the size of each data packet that has been transmitted. For example, the body 408 may indicate, for each of the data packets within the sequence, a number of bytes in the data packet and the sequence number associated with the data packet.

Network Environment

Figure 5:
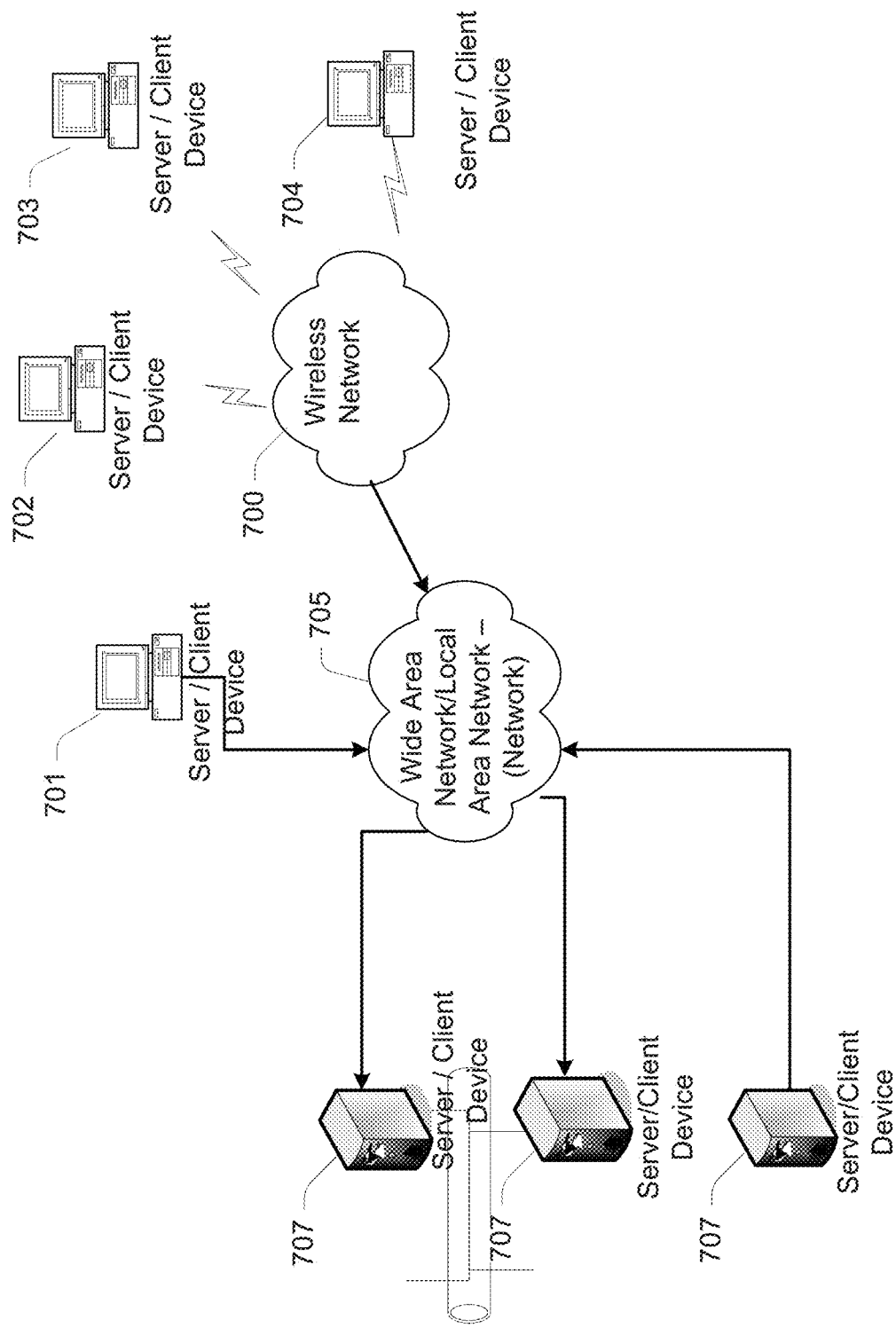
FIG. 5 is a schematic diagram illustrating an example implementation of a network.

The disclosed implementations may be implemented in any of a wide variety of computing contexts. FIG. 5 is a schematic diagram illustrating an example implementation of a network. Other implementations that may vary, for example, in terms of arrangement or in terms of type of components, are also intended to be included within claimed subject matter.

Implementations are contemplated in which users interact with a diverse network environment via any type of computer (e.g., desktop, laptop, tablet, etc.), media computing platforms (e.g., cable and satellite set top boxes and digital video recorders), handheld computing devices (e.g., PDAs), cell phones, or any other type of computing or communication platform.

As shown, FIG. 5, for example, includes a variety of networks, such as a LAN/WAN 705 and wireless network 700, a variety of devices, such as client devices 701-704, and a variety of servers 707 such as content server(s), a web server, and/or a search server. Client device(s) 701-704 may be implemented, for example, via any type of computer (e.g., desktop, laptop, tablet, etc.), media computing platforms (e.g., cable and satellite set top boxes), handheld computing devices (e.g., PDAs), cell phones, or any other type of computing or communication platform.

The disclosed implementations may be implemented in some centralized manner. This is represented in FIG. 5 by server(s) 707, which may correspond to multiple distributed devices and data store(s). The client devices 701-704 and the server(s) 707 may be further configured to operate according to various implementations described herein. In some implementations, each of the devices 701-704 and 707 is configured to operate as both a client device and a server.

A network may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

Services may also be provided in a peer-to-peer network. A peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling devices via an ad hoc arrangement or configuration. A peer-to-peer network may employ some devices capable of operating as both a "client" and a "server."

The network environment may include a wireless network that couples client devices with a network. A wireless network may employ stand-alone ad-hoc networks, mesh networks, Wireless LAN (WLAN) networks, cellular networks, or the like.

A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Communications transmitted via a network typically include signal packets. Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6.

Signal packets may be communicated between devices of a network, such as, for example, to one or more sites employing a local network address. A signal packet may, for example, be communicated over the Internet from a user site via an access device coupled to the Internet. Likewise, a signal packet may be forwarded via network devices to a target site coupled to the network via a network access device, for example. A signal packet communicated via the Internet may, for example, be routed via a path of gateways, servers, etc. that may route the signal packet in accordance with a target address and availability of a network path to the target address.

Various implementations may be employed via one or more servers. A computing device that is capable of sending or receiving signals, such as via a wired or wireless network, or capable of processing or storing signals, such as in memory as physical memory states, may operate as a server. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Examples of devices that may operate as a content server include desktop computers, multiprocessor systems, microprocessor-type or programmable consumer electronics, etc.

Client Device

Figure 6:
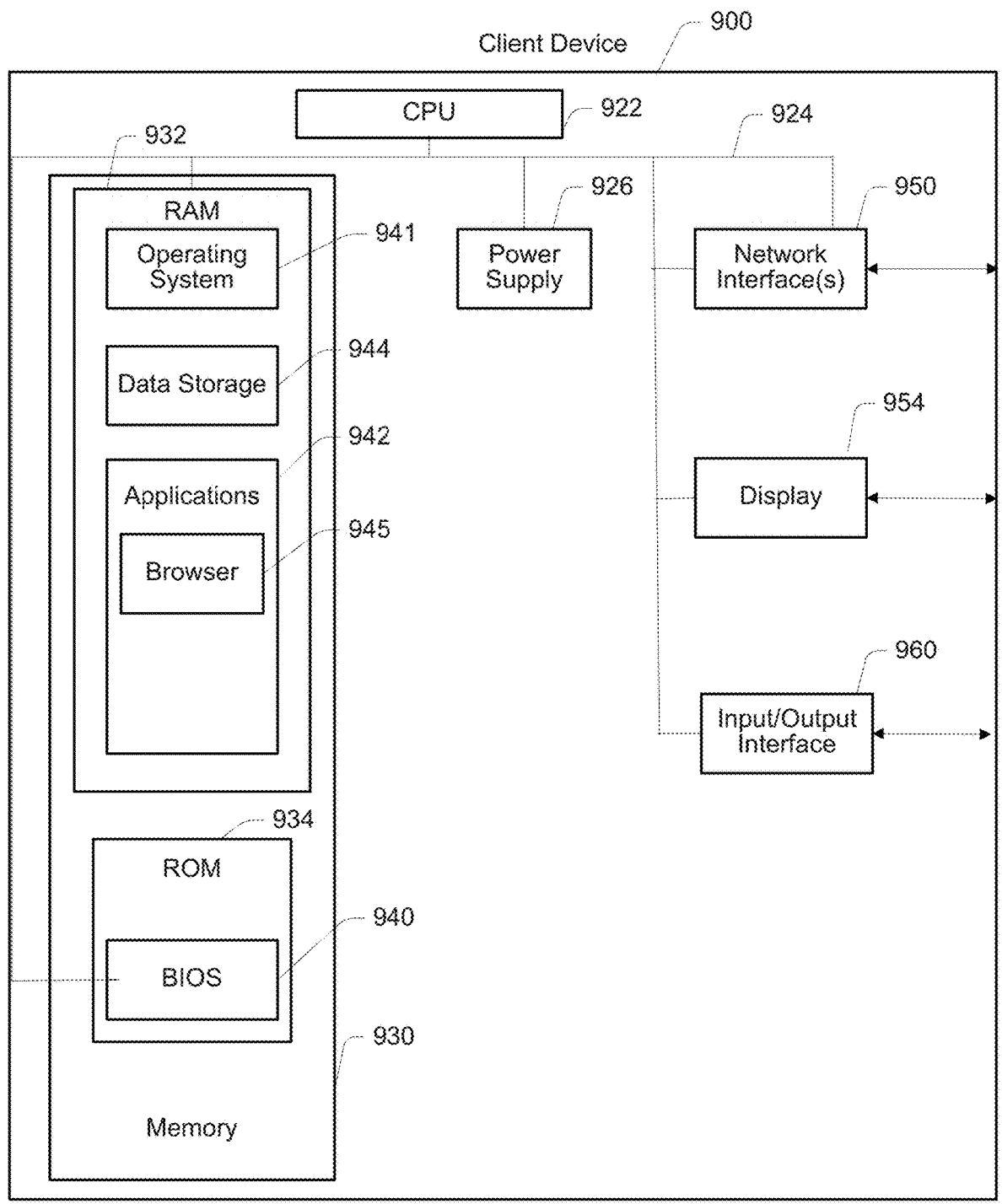
FIG. 6 is a diagram illustrating an example client device.

FIG. 6 is a schematic diagram illustrating an example implementation of a client device in which various implementations may be implemented. A client device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like. A portable device may also be referred to as a mobile device or handheld device.

As shown in this example, a client device 900 may include one or more central processing units (CPUs) 922, which may be coupled via connection 924 to a power supply 926 and a memory 930. The memory 930 may include random access memory (RAM) 932 and read only memory (ROM) 934. The ROM 934 may include a basic input/output system (BIOS) 940.

The RAM 932 may include an operating system 941. More particularly, a client device may include or may execute a variety of operating systems, including a personal computer operating system, such as a Windows, iOS or Linux, or a mobile operating system, such as iOS, Android, or Windows Mobile, or the like. The client device 900 may also include or may execute a variety of possible applications 942 (shown in RAM 932), such as a client software application. The client device 800 may also include or execute an application to communicate content, such as, for example, textual content, multimedia content, or the like, which may be stored in data storage 944. A client device may also include or execute an application such as a browser 945 to perform a variety of possible tasks, such as browsing, searching, playing various forms of content, including locally stored or streamed video, or games (such as fantasy sports leagues).

The client device 900 may send or receive signals via one or more interface(s). As shown in this example, the client device 900 may include one or more network interfaces 950. In addition, the client device 900 may include a display 954. The client device 900 may further include an Input/Output interface 960.

The client device 900 may vary in terms of capabilities or features. Claimed subject matter is intended to cover a wide range of potential variations. The foregoing is provided to illustrate that claimed subject matter is intended to include a wide range of possible features or capabilities.

Regardless of the system's configuration, it may employ one or more memories or memory modules configured to store data, program instructions for the general-purpose processing operations and/or the techniques described herein. For example, the program instructions may control the operation of one or more applications. The memory or memories may also be configured to store instructions for performing the disclosed methods.

Because such information and program instructions may be employed to implement the systems/methods described herein, the disclosed implementations relate to machine readable media that include program instructions, state information, etc. for performing various operations described herein. Examples of machine-readable media include, but are not limited to, magnetic media such as hard disks and magnetic tape; optical media such as CD-ROM disks; magneto-optical media such as optical disks; and hardware devices that are specially configured to store and perform program instructions, such as ROM and RAM. Examples of program instructions include both machine code, such as produced by a compiler, and files containing higher level code that may be executed by the computer using an interpreter.

Computer program instructions with which various implementations are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The disclosed techniques may be implemented in any suitable combination of software and/or hardware system, such as a web-based server or desktop computer system. An apparatus and/or web browser may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the disclosed method steps.

Although the foregoing implementations have been described in some detail for purposes of clarity of understanding, it will be apparent that certain changes and modifications may be practiced within the scope of the appended claims. Therefore, the present implementations are to be considered as illustrative and not restrictive and the present disclosure is not to be limited to the details given herein, but may be modified within the scope and equivalents of the appended claims.

What is claimed is:

1. A method, comprising:
   composing, by a client device, a plurality of data packets;
   transmitting, by the client device to a server, the plurality of data packets via two or more ports of a plurality of ports of the client device such that a first subset of the plurality of data packets is transmitted via a first port of the plurality of ports of the client device and a second subset of the plurality of data packets is transmitted via a second port of the plurality of ports of the client device;
   composing, by the client device, a control packet, wherein the control packet indicates a size of each of the plurality of data packets; and
   transmitting, by the client device, the control packet to the server.

2. The method as recited in claim 1, wherein the plurality of data packets and the control packet each include a header that comprises an identifier associated with both the plurality of data packets and the control packet.

3. The method as recited in claim 1, wherein transmitting the plurality of data packets comprises:
   for each of the two or more ports, transmitting, via a media access control (MAC) address of each next-hop router, at least one data packet.

4. The method as recited in claim 1, wherein the plurality of data packets are transmitted according to random sampling intervals.

5. The method as recited in claim 1, comprising:
for a data packet of the plurality of data packets:
selecting, by the client device, a packet size for the data packet; and
padding, by the client device, the data packet according to the packet size.

6. The method as recited in claim 1, comprising:
ascertaining, by the client device, a number of the plurality of ports via which to send the plurality of data packets;
wherein transmitting the plurality of data packets is performed according to a result of ascertaining a number of ports via which to send the plurality of data packets.

7. The method as recited in claim 1, wherein the plurality of data packets are encapsulated in Ethernet frames.

8. An apparatus, comprising:
a processor; and
a memory, at least one of the processor or the memory being configured to:
compose a plurality of data packets;
transmit the plurality of data packets to a server via two or more ports of a plurality of ports of a client device such that a first subset of the plurality of data packets is transmitted via a first port of the plurality of ports of the client device and a second subset of the plurality of data packets is transmitted via a second port of the plurality of ports of the client device;
compose a control packet, wherein the control packet indicates a size of each of the plurality of data packets; and
transmit the control packet to the server.

9. The apparatus as recited in claim 8, wherein the plurality of data packets and the control packet each include a header that comprises an identifier associated with both the plurality of data packets and the control packet.

10. The apparatus as recited in claim 8, wherein transmitting the plurality of data packets comprises:
for each of the two or more ports, transmitting, via a media access control (MAC) address of each next-hop router, at least one data packet.

11. The apparatus as recited in claim 8, wherein the plurality of data packets are transmitted according to random sampling intervals.

12. The apparatus as recited in claim 8, at least one of the processor or the memory being configured to:
for a data packet of the plurality of data packets:
select a packet size for the data packet; and
pad the data packet according to the packet size.

13. The apparatus as recited in claim 8, wherein the plurality of data packets and the control packet are transmitted via User Datagram Protocol (UDP).

14. The apparatus as recited in claim 8, wherein the plurality of data packets are encapsulated in Ethernet frames.

15. A non-transitory computer-readable storage medium storing thereon computer-readable instructions that, when executed, cause a processor to:
compose a plurality of data packets;
transmit the plurality of data packets via two or more ports of a plurality of ports of a client device such that a first subset of the plurality of data packets is transmitted via a first port of the plurality of ports of the client device and a second subset of the plurality of data packets is transmitted via a second port of the plurality of ports of the client device; and
compose a control packet, wherein the control packet indicates a size of each of the plurality of data packets.

16. The non-transitory computer-readable storage medium as recited in claim 15, wherein the plurality of data packets and the control packet each include a header that comprises an identifier associated with both the plurality of data packets and the control packet.

17. The non-transitory computer-readable storage medium as recited in claim 15, wherein transmitting the plurality of data packets comprises:
for each of the two or more ports, transmitting, via a media access control (MAC) address of each next-hop router, at least one data packet.

18. The non-transitory computer-readable storage medium as recited in claim 15, wherein the plurality of data packets are transmitted according to random sampling intervals.

19. The non-transitory computer-readable storage medium as recited in claim 15, wherein the computer-readable instructions, when executed, cause the processor to:
for a data packet of the plurality of data packets:
select a packet size for the data packet; and
pad the data packet according to the packet size.

20. The non-transitory computer-readable storage medium as recited in claim 15, wherein the plurality of data packets are encapsulated in Ethernet frames.

* * * * *